INVENTOR
WARREN H. LANG

INVENTOR
WARREN H. LANG

BY McLean, Morton & Boustead
ATTORNEYS

United States Patent Office 3,511,375
Patented May 12, 1970

3,511,375
PROCESS AND APPARATUS FOR HYDRAULI-
CALLY SEPARATING PARTICULATE SOLIDS
ACCORDING TO PARTICLE SETTLING RATE
Warren H. Lang, Bartow, Fla., assignor to Wellman-Lord,
Inc., a corporation of Florida
Filed Oct. 2, 1968, Ser. No. 775,977
Int. Cl. B03b 3/34
U.S. Cl. 209—454                28 Claims

ABSTRACT OF THE DISCLOSURE

A process and apparatus for hydraulically separating particulate solids according to particle settling rate is disclosed. The process comprises introducing the feed pulp to an upper, or fine sizing, region of a vertically disposed sizing zone, which upper region is of increasingly larger cross-sectional area from its bottom to its top, and simultaneoulsy introducing driving liquid into the bottom of the lowermost, or coarse sizing, region of the zone, which lowermost region is of uniform cross-sectional area throughout its height. A minimum amount of accumulated coarse material is maintained in the lowermost region at all times; excess accumulated material is periodically removed therefrom. A preferred apparatus for performing the process is a hindered hydraulic settling vessel which has a plurality of coarse sizing chambers arranged in a vertically cylindrical, annular tank, the coarse sizing chambers being separated by an equal number of vertically disposed baffle plates. The outer wall of the tank rises vertically above the tops of the baffle plates but the upper portion of the inner wall inclines inwardly in a frusto-conical shape, thereby defining an upper zone of gradually increasing cross-sectional area. Feed slurry is introduced to the upper zone, preferably as a downward flow along the side of the conically shaped inner wall. The time and duration of discharge of sized coarse material from each, or a group, of the coarse sizing chambers is preferably controlled independently of conditions existing in the remaining chambers.

This invention relates to a process and apparatus for hydraulic sizing or classification of solids according to particle settling rate. More particularly, it relates to a process, and apparatus therefor, wherein the slurry of solids to be separated is introduced into the upper region of a vertically disposed sizing zone, a continuous vertical rise of driving liquid is maintained in the sizing zone, said liquid rising from the bottom of the zone through a lowermost region therein of uniform cross-sectional area into the upper region of increasingly larger cross-sectional area, non-settling solids are withdrawn near the top of the upper region of the zone, and settling solids are allowed to accumulate in the lowermost region to provide a minimum bed height therein, the excess being periodically discharged. The apparatus to which the invention relates is a hindered hydraulic settling vessel having one or more lower chambers to receive settling particles (hereinafter referred to as "coarse sizing chambers") which chambers are in communication with a single upper chamber for receiving the non-settling particles (hereinafter referred to as the "fine sizing chamber"). The coarse sizing chamber, or chambers, is of uniform cross-esctional area throughout its height and the fine sizing chamber is of increasingly larger cross-sectional area from bottom to top. In a preferred embodiment of the invention a plurality of coarse sizing chambers is employed and the time and duration of discharge of sized coarse material in each, or a group, of the coarse sizing chambers is preferably controlled automatically and independently of the conditions existing in the other chambers.

In the classification of particles of substantially the same specific gravity, such as ores and other mineral substances, into coarse and fine particles, a technique commonly employed is that which is known as hydraulic free-settling. By this method the solids to be classified are introduced, for instance in the form of an aqueous slurry or pulp, into the upper region of a sizing column containing an upwardly flowing current of liquid, e.g., water or brines, which is moving at a given velocity or "rise" rate. This upwardly flowing current of liquid may be referred to as the driving liquid or, in aqueous systems, as the hydraulic water. The solids particles which do not settle against the current of driving liquid, i.e. the fines, are carried upwardly with the current and collected in an overflow launder. Coarser particles fall through the rising current, accumulate at the foot of the column, and are removed therefrom as a slurry of coarse product, for example by siphoning or by pressure or gravity discharge means. The same technique can be employed to effect a classification of particles of approximately the same size but of different specific gravities. In the latter case the non-settling solids may be termed the light material and the settling solids the dense material. The apparatus of the present invention can be used to perform either type of classifiaction. For purposes of simplicity, however, the following discussion will refer only to classification according to particle size characteristics, but the term "coarse material" and "fines" are intended, herein and in the claims, to also embrace dense and light materials, respectively, as those terms are used to designate the underflow and overflow products obtained in classification according to particle density characteristics.

To effect a more efficient separation between coarse material and fines a constriction is often placed in the sizing column below the point of slurry entry. Due to the lesser cross-sectional area of the column in the region of the constriction than in the region above it, the velocity of the upwardly flowing liquid is proportionately higher in the constricted region than in the upper zone. The result is that, whereas the coarse solids introduced to the upper zone would normally fall more rapidly against the rising current, they are temporarily repelled by the higher velocity currents at the constriction and therefore settle out more slowly. There can result in this system a buildup of particles in agitated suspension in the constricted portion of the column. The particles therein are often said to be "in teeter" and that portion of the column is sometimes called the "teeter zone." Because of the higher density in the teeter zone the downward travel of the coarse solids is additionally hindered by their having to pass through it. The overall decrease in settling rate of solids particles in the column provides for a longer residence time of the solids being separated and more efficient classification or fractionation of particles in accordance with their differences in settling rate.

The attainment of high efficiencies in an open tank type, large capacity hindered hydraulic settling vessel depends, however, on a uniform distribution of feed pulp and uniform vertical rising currents across any given horizontal cross section in the teeter zone. The formation of unequal pulp densities across any given cross sectional area will bend and deflect vertical rising water currents bringing about the development of unequal velocities and equal settling rates. For example, in the standard open tank type hydraulic sizing unit composed of an upper cylindrical section, an inverted frusto-conical middle section and a smaller cylindrical lower section, it is practically impossible to eliminate the formation of unequal pulp densities in the teeter zone. Examples of such open tank hindered hydraulic sizing vessels are disclosed, for instance, in U.S. Pats. Nos. 2,708,517; 2,-784,841; 2,967,617; and 3,032,194 to Evans et al. and in U.S. Pat. No. 3,295,677 to Condolios et al. Because of the design, i.e. cylindrical teeter column expanding above into an inverted frusto-conical section, solids in the feed entering from above will tend to in a large part settle on or impinge on the inside skin of the inverted truncated cone section and subsequently will slide down into the periphery of the teeter zone. This design sets up a condition where the pulp solids are of greatest density around the outside edges of the teeter column zone and of minimum density in the center of the teeter zone. Such an unequal pulp density distribution brings about a series of downwardly plunging currents around the outer edges of the teeter zone and currents of maximum upward velocity in the center thereof. The result is decreased sizing efficiency, primarily because of the entrainment of substantial amounts of fines with those particles which settle in the peripheral area of the teeter zone.

Such sizing devices are frequntly employed in the phosphate industry—often, for example, to make a 35 mesh or 20 mesh classification of the ground or unground ore. The type unit just described, when employed to make a 35 mesh separation of phosphate ore, based on 30% +35 mesh and 70% −35 mesh feed, often recover about 83% of the fines in the fine overflow while recovering about 83% of the coarse solids in the coarse discharge. Following the subjection of the feed mixture to the action of such a hydraulic settling vessel, the fine product and coarse produce are sent to separate benefication steps wherein the phosphate particles are separated from the gangue by certain flotation techniques. The efficiency of the flotation benefication step depends on, among other factors, the feed thereto being efficiently pre-sized. Thus, in the coarse flotation circuit phosphatic coarse material is most effectively separated from the gangue coarse material when the amount of fines in the coarse feed mixture is held to a minimum. Similarly, the fines flotation circuit is designed to effect a more efficient separation of phosphatic fines from fine gangue material when there is little or no coarse material entering with the feed. Accordingly, it is very important in that particular application, as it is in many other uses, that the preceding sizing operation be as efficient as is practicable, and an efficientcy of only 83%, as discussed above, is often times lower than desired. For these reasons, it is important that a sizing device be capable of being operated at high efficiencies and, for reasons of economy, be able to do so while handling large volumes of material as well.

By the present invention is provided a process and apparatus for accomplishing highly efficient classification of particulate solids by the hindered hydraulic settling technique. Moreover, the apparatus of the present invention is capable of being built large enough to handle high volumes of feed without sacrificing efficiency. As indicated above, the apparatus is useful for separation of different size particles of the same specific gravity or for separating solids particles of different specific gravities. The vessel of the present invention can, for example, when sizing a 30% +35 mesh and 70% −35 mesh feed, recover as much as about 90% of the fines in the feed (as fines overflow) while recovering about 95% of the coarse material introduced to it (as coarse underflow, or discharge).

The hindered hydraulic settling vessel of the present invention employs a circuitous, or wrap-around, configuration for the settling tank. In a preferred embodiment of the invention the settling tank is annular in form, i.e. the inner and outer walls thereof are both cylindrically shaped. It is also preferred that the lower portion of the tank be partitioned into a plurality of coarse sizing chambers. The upper portion of the tank is free of partitions and constitutes a fine sizing chamber which is in communication with all of the coarse sizing chambers. This fine sizing chamber is of increasingly larger cross-sectional area than the lower portion due to the inward inclination of that portion of the inner wall of the tank which rises above the coarse sizing chambers. The partitioning is effected by use of vertically disposed baffle plates; often there will be employed about 4 to 60 such plates per unit or tank. The upper ends of these plates preferably terminate at a level no higher than the level of the juncture of the upper and lower portions of the inner wall; most preferably, they terminate at approximately the level of such juncture.

At the top of the vessel is provided means for removing the non-settling solids, e.g., a suitable overflow launder, and each of the coarse sizing chambers is provided with means for removing accumulated settled solids, e.g., a discharge spigot located near the botom of the chamber. Fresh driving liquid (hereinafter referred to as hydraulic water) is supplied to inlets at the bottom of each of the coarse sizing chambers. Above each of the water inlets, but near the bottom of the chambers, is positioned water distribution means, such as a constriction plate. Preferably, the velocity and amount of the hydraulic water can be individually regulated for each of the inlets and, preferably, the inlet pressure of the hydraulic water entering any one, or a group, of the chambers will be substantially non-responsive to back pressure conditions existing in the remaining chambers. That is, if conditions become such in the vessel that, for example, the coarse sizing chambers on one side of the vessel are more heavily loaded with accumulated coarse material than those on the other side, the greater back pressures in the more heavily loaded chambers will not be transmitted to the hydraulic water entering the remaining chambers and will not serve to increase the inlet pressures in the latter. Known flow-regulating means can be employed to this end.

The feed pulp, or mixed solids slurry, is introduced to the fine sizing chamber of the tank; preferably it is introduced as a stream flowing down the inclined sides of the upper portion of the inner wall. The angle of inclination of the upper portion of the inner wall will generally range from about 10 to 40° from vertical. Where the lower portion of the inner wall is cylindrically shaped, it is preferred that the upper portion thereof be frustoconically shaped. The likelihood of more even distribution of the solids can, if desired, be enhanced by providing shroud means to cover the top section of the upper portion of the inner wall and to extend part way down the sides thereof. Such shroud is preferably in the same shape as the upper portion of the inner wall and is spaced apart from it to provide a circuitous, e.g. annular, space which opens downwardly into the tank. Downwardly flowing feed pulp may then be introduced to the system via this circuitous opening. The bottom edge of the shroud, if employed, will preferably terminate at some level above the top of the coarse sizing chambers; the optimum point of termination can vary depending on other design variables, such as angle of inclination of the shroud, the width of the circuitous opening, etc.

There is preferably provided means for continuously monitoring the amount of accumulated coarse material in each, or in representative ones, of the coarse sizing chambers during operation of the vessel. When the amount of coarse material accumulated in a monitored chamber reaches a predetermined maximum the monitoring device transmits a stimulus, or signal, such as a pneumatic, hydraulic or electrical signal, to the coarse product discharge means for the chamber, or chambers, being served by the montior, thereby activating the discharge means for the chamber, or chambers, and initiating the dumping of the accumulated coarse material therefrom. The maximum permissible amount of accumulated coarse material for the monitored chamber can be predetermined so as to ensure that the sizing in that chamber (and in any other chambers being controlled by the same monitoring device) will be conducted as efficiently as is practicable, regardless of the conditions existing in the remaining coarse sizing chambers. Thus, for example, it might be predetermined that the maximum permissible amount of accumulated coarse material for a chamber should be that amount represented by a bed of accumulated material extending, say, to about 90% of the height of the coarse sizing chamber. By the term "bed" is not meant, obviously, a tightly packed column of dormant, coarse material but, rather, a column of settled coarse material in dense, teetering suspension.

Alternatively, but less preferred, monitoring means can be employed so as to be operable to activate all of the discharge valves for all of the chambers simultaneously upon the amount of accumulated coarse material in all of the chambers reaching a predetermined level. Thus, for example, dumping of the sized material could be delayed until every chamber has a bed height extending to the top of the baffle plates. While one chamber might accumulate coarse material more rapidly than an adjacent chamber, as the bed height in the first reaches the top of the baffle plates the excess coarse material will spill over into the adjacent chamber, and so on around the vessel until all of the chambers are filled with sized material, at which point the monitoring means, sensing this condition, will activate the coarse product discharge means for all of the chambers. As indicated above, however, it is preferred that each chamber, or a group of chambers, be so controlled by their respective monitoring devices that their dumping means be operated independently of the conditions existing in the remaining chambers.

Deactivation of the discharge means is also automatically controlled and can be effected, for example, by the monitoring device transmitting a second signal to the discharge means once the amount of accumulated coarse material in the monitored chamber has decreased to a predetermined minimum. Alternatively, the discharge means can be controlled by a pre-set timer mechanism which halts the discharge at a set time after the monitoring device has initiated it. In order to ensure against the deep penetration of fine material into the coarse sizing chambers, each coarse sizing chamber is preferably maintained with a bed of accumulated coarse material extending, say, to at least about 5 or even 15, percent of the height of the chamber. Preferably, then, dumping of accumulated coarse material will cease when this minimum level, which, in absolute figures, will often represent a bed height of at least 1 or 2 feet, is reached.

Any suitable device for monitoring the amount of accumulated coarse material in the coarse sizing chambers can be employed. Such a device will usually monitor the effect of the presence of the sized coarse material rather than measure the amount of the material directly. Thus, for example, a monitoring device can be employed which is responsive to the differential pressure or differential head existing in a zone of the coarse sizing chamber lying between the top and the bottom of the chamber. An increase in the amount of accumulated coarse material effects an increase in the differential pressure or head existing along the height of the chamber, and differential head meters known in the art can therefore be utilized to monitor the amount of sized coarse material in the chamber. Similiarly, since the pulp density within the chamber increases as the amount of size coarse material increases, there can be employed as the monitoring means any of various known density meter devices, resonant paddle devices, etc., which would be responsive to changes in conditions of pulp density within the chamber.

The wrap-around design of this unit facilitates the use of such multiple, independently controleld coarse sizing chambers as described above. Advantageously, the coarse sizing chambers are made as narrow as practicable in order to allow buildup of maximum pulp densities of sized product without plugging or sanding of the unit. Each chamber's horizontal cross sectional area will, for example often be in the range of about 0.75 to 12 square feet, preferably about 1.75 to 3.25 square feet. Particles teetering under high pulp density develop a frictional particle-to-particle resistance which enables use of higher vertical water velocities through the pulp without the lifting of the pulp. The frictional resistance of the particles in teeter also tends to effectively distribute and equalize the vertical rising currents. The attainment of higher densities of particles in teeter than heretofore possible, plus the ability to use vertical currents of higher velocity than heretofore possible enables the coarse product to be sized closer to ideal specifications when using the process and apparatus of the present invention than has heretofore been possible.

The fine sizing chamber is so designed that the strong vertical currents developed in the coarse sizing chambers are slowly reduced in velocity as they pass upward through the fine sizing chamber, until only the desired on-size material overflows near the top of the fine sizing chamber. Also, the vertical current in the upper portion of the fine sizing chamber can be varied, especially when employing a feed distribution shroud, by varying the amount of water added to the incoming fed. This sets up a secondary driving current discharging from the bottom of the shroud.

If desired, there can also be positioned in the fine sizing chamber separate withdrawal means for removing an intermediate or "middling" fraction from the vessel, that is, to withdraw those particles which are too small, or too light, to settle in the coarse sizing chambers but at the same time are to large, or to heavy, to be carried to the fines overflow. Such middling material can then be either collected separately as a third fraction or product, or, if preferred, can be combined with the fines product or with the coarse product.

The invention can be better understood by reference to the accompanying drawings which illustrate one form of the invention and which are offered solely for the purpose of illustration and are in no manner to be considered as limiting the scope of the invention.

Figure 1:
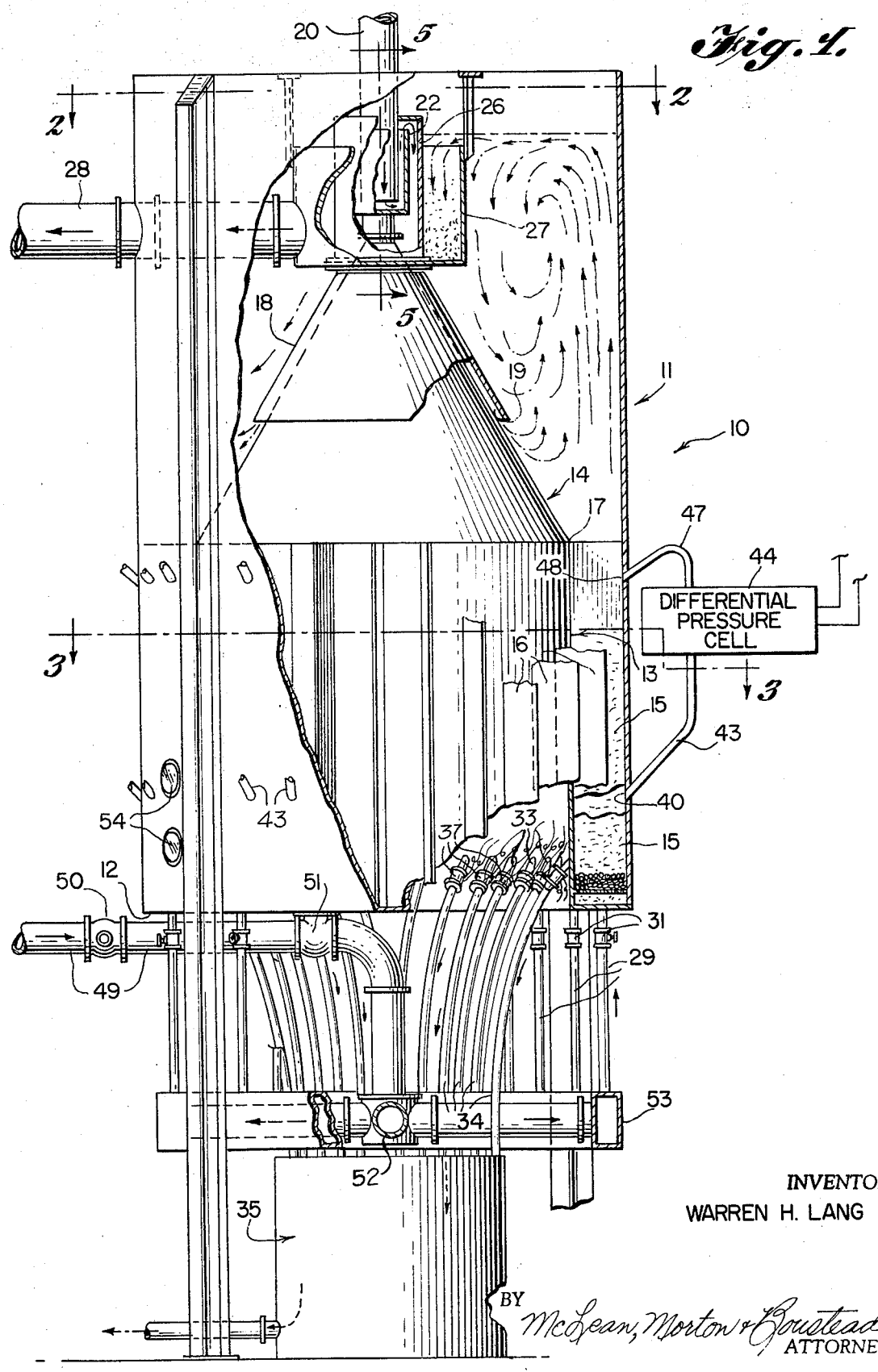
FIG. 1 is a side elevation of a settling vessel of the present invention with parts for the vessel broken away.
Figure 2:
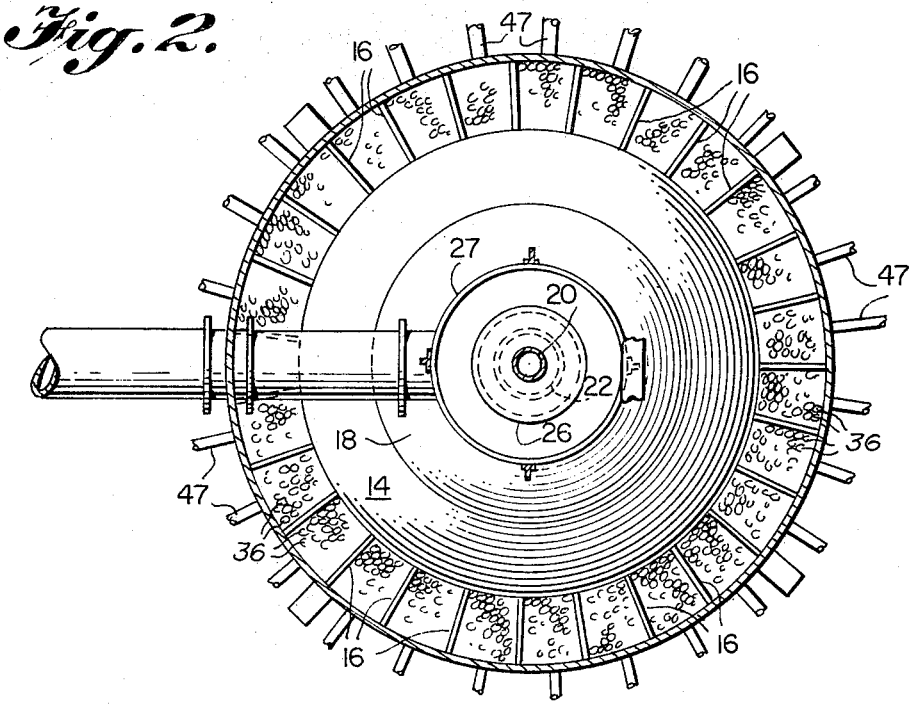
FIG. 2 is a horizontal cross sectional view taken along line 2—2 of FIG. 1.
Figure 3:
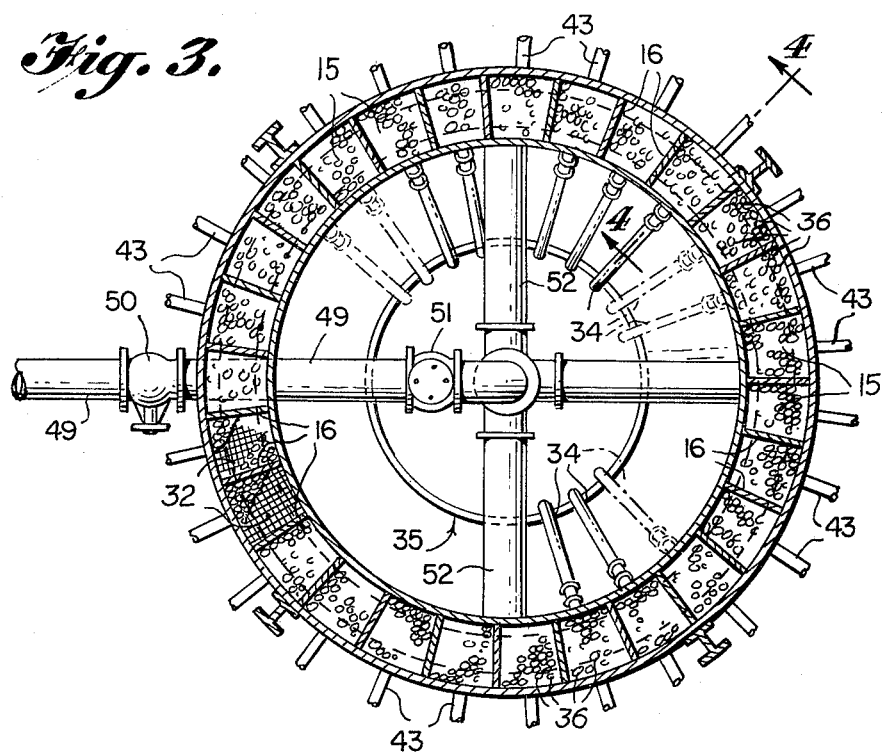
FIG. 3 is a horizontal cross sectional view taken along line 3—3 of FIG. 1.

Referring to the drawings, the settling vessel comprises an annular, vertically disposed tank, generally designated by numeral 10, which has a cylindrical outer wall 11 and a flat bottom 12. The inner wall of tank 10 is divided into two portions; the lower portion 13 of the inner wall rises concentrically with the outer wall 11 to a level about midway between the top and the bottom of the outer wall. Above this point the upper portion 14 of the inner wall inclines inwardly in a frusto-conical shape. Windows 54 afford observation of the coarse sizing chambers to aid in valve adjustment.

A series of vertically disposed baffle plates 16 divides the annular space lying between the lower portion 13 of the inner wall and the lower portion of the outer wall 11 into a series of coarse sizing chambers 15. The baffle plates are shown as being coterminus with the lower portion 13 of the inner wall, as it is preferred that the upper ends of the baffle plates terminate at approximately the level of the juncture 17 of the upper and lower portions of the inner wall. Also, in order to permit localized control of the coarse product discharge rate in each of the chambers 15, the lower ends of baffle plates 16 should terminate at the tank's bottom plate 12.

Positioned above the frusto-conically shaped upper portion 14 of the inner wall and spaced apart therefrom is shroud 18 which is of the same frusto-conical shape as the upper portion of the inner wall and is coaxially aligned therewith. The annular space 19 lying between the shroud 18 and the upper portion 14 of the inner wall serves as a feed pulp delivery chute.

Figure 5:
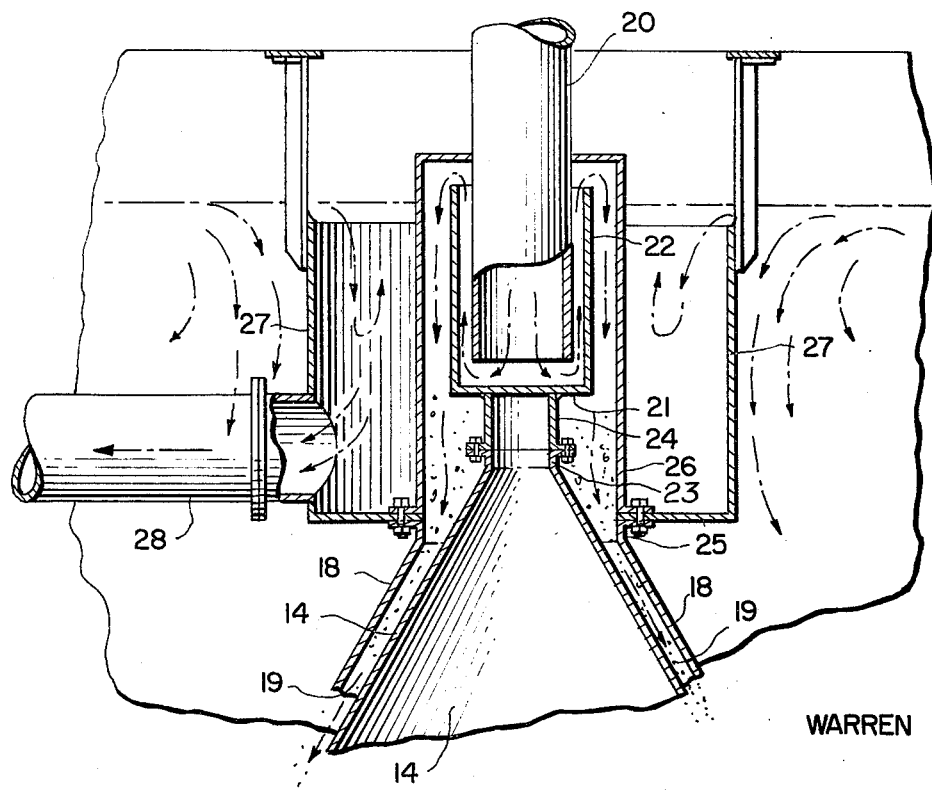
FIG. 5 is an enlarged vertical cross sectional view taken along line 5—5 of FIG. 1.

Positioned above tank 10 is a slurry feed pipe 20 which is connected to an external source (not shown) of the solids-liquid slurry, or pulp, the solids of which are to be classified. As shown more clearly in FIG. 5, the bottom of slurry feed pipe 20 terminates above, and over the center of, solid base plate 21 of the open-top, vertically cylindrical feed distributor 22. Distributor 22 is rigidly mounted above the top of the frusto-conically shaped upper portion 14 of the inner wall by joinder of the flanged distributor stem 23 and the flanged neck 24 of the upper portion 14 of the inner wall. Mounting or support means for feed pipe 20 are not illustrated.

The upper edge of frusto-conically shaped shroud 18 terminates at juncture 25 which is below the level of the inner wall neck 24.

At juncture 25 the shroud 18 is coaxially joined to shroud neck 26 which is a closed-top, vertically disposed hollow cylinder having a larger diameter than distributor 22 and terminating at its upper edge at a level above the upper edge of distributor 22. Thus, the combination of shroud 18 and shroud neck 26 is seen to resemble the shape of a capped, inverted funnel.

Encircling shroud neck 26 is a vertically cylindrical, annular overflow receptacle 27 which is of larger diameter than the shroud neck but smaller than the diameter of outer wall 11 of tank 10. The upper edge of overflow receptacle 27 terminates at a level below the upper edge of shroud neck 26 and below the top of the tank's outer wall 11. Extending laterally from the side wall of overflow receptacle 27 and through outer wall 11 is fines discharge line 28.

Figure 4:
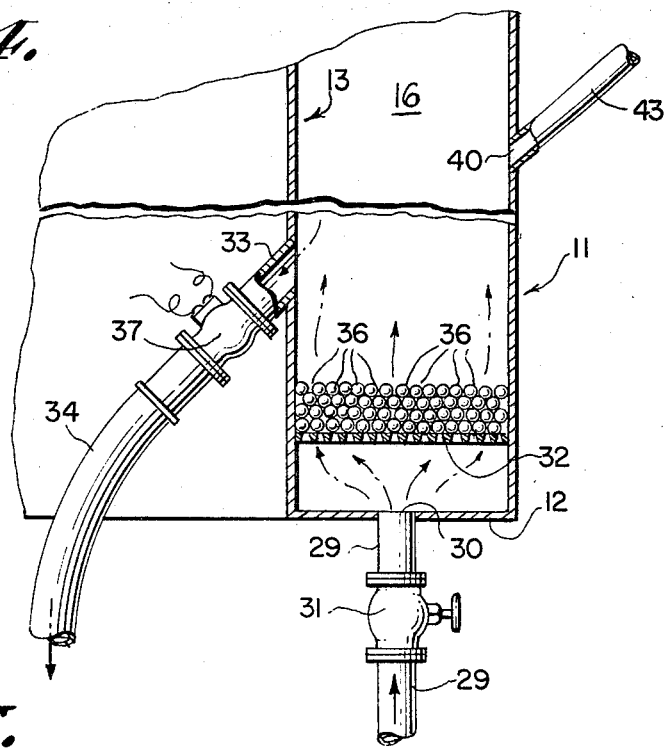
FIG. 4 is an enlarged sectional detail view taken along line 4—4 of FIG. 3.

Positioned at the bottom of each of the coarse sizing chambers 15 is means for supplying an upward flow of driving liquid, which will hereinafter be referred to as water; in the drawings (see particularly FIG. 4) this supply means is illustrated as fresh water feed line 29 which is connected to an opening 30 in tank bottom 12 located midway between the baffle plates 15 and midway between the outer wall 11 and the lower portion 13 of the inner wall. Manually operated valve 31 is provided in the feed line for adjusting the volume of water flowing into the coarse sizing chamber. Water distributing means are placed in the bottom of each of the chambers 15 above the water inlet opening 30 but below the coarse product discharge pipe 33. In the drawings this distributing, or dispersing, means is illustrated as a stainless steel constriction plate 32 mounted a short space above opening 30 and having supported thereon a multilayer packing of steel balls 36.

The driving water is supplied to each of the fresh water feed lines 29 via water supply line 49, in which is located main valve 50 and check valve 51, radial lines 52 and toroidally shaped distribution chamber 53.

Each of the coarse sizing chambers 15 is provided with a coarse product discharge pipe 33 which in turn is connected to a flexible, coarse product discharge line 34 which terminates in coarse product collection tank 35. Pipe 33 is positioned near the bottom of the sizing chamber but above the water dispersing means, i.e. rod deck 32 and steel ball packing 36. Pipe 33 is provided with automatically operated valve means 37 which opens or closes in response to stimuli, such as air, hydraulic or electrical stimuli, transmitted by actuating mechanism 44.

Located in the lower half of each of the chambers 15, for instance at about one-third height from the bottom, is an orifice 40 in the tank's outer wall 11 which is connected to line 43 which places the interior of the chamber at that point in communication with differential pressure cell 44, which, for the sake of clarity, is indicated in FIG. 1 in block form. And located in the upper half of chamber 15, for instance at about nine-tenths height from the bottom, is a second orifice 48 which, via line 47, is also in communication with differential pressure cell 44. Such a differential pressure cell arrangement is just one example of a suitable monitoring means for use in the apparatus of the present invention. As indicated above, other monitoring means responsive to change in the amount of coarse material accumulated in chambers 15 can be used as well.

The function of differential pressure cell 44 as indicated in the drawings is to monitor the pressure differential existing along the height of the zone extending between the levels of orifices 40 and 48 in chamber 15 and to transmit activating, or valve opening, stimuli to discharge valve 37 in response to that pressure differential rising to a predetermined maximum level and to transmit valve closing stimuli to valve 37 in response to the pressure differential dropping to a predetermined minimum level. For exemplification purposes, differential pressure cell 44 and discharge valve 37 are illustrated in the drawings as having electrical leads for transmission of electrical stimuli therebetween.

The operation of the settling vessel illustrated in the drawings proceeds as follows. Upwardly flowing driving water is continuously supplied to each of the coarse sizing chamber 15 via fresh water lines 29, valves 31 and openings 30. Horizontal currents in the coarse sizing chambers are kept to a minimum by the presence of the baffle plates 16. There is also being continuously supplied to the fine sizing region of the tank 11 a feed pulp containing the solids to be classified. The feed pulp enters distributor 22 from slurry feed pipe 20, spills over the top of distributor 22 and into the annular space between the outside of distributor 22 and the inside of shroud neck 26. From there the feed pulp flows down through the delivery chute 19, which is the annular space separating shroud 18 and upper portion 14 of the inner wall of tank 10.

As the feed leaves delivery chute 19, the solids therein are thrown into an area of high vertical water velocity. The fine particles are lifted upward and overflow into overflow receptacle 27 from which they are discharged via fine product discharge line 28 to a fine product collection zone (not shown). The coarsest solids fall by force of gravity down through the vertical current in coarse sizing chambers 15 and collect at the bottom thereof until they are drawn off in slurry form through pipes 33, valves 37 and coarse product discharge lines 34 into coarse product collection tank 35.

The rate of fresh water entry into chambers 15 via openings 30, the rate of introduction of feed pulp into tank 10, the solids content of the feed pulp and the rate of coarse product withdrawal through valves 37 are all coordinated so as to effect an underflow of desired coarse product and an overflow of desired fine product. The density of the pulp is, of course, greatest in the coarse sizing chambers 15. The teeter established in the teeter zones often acts somewhat like a heavy density liquid, in that the particles introduced to it do not immediately penetrate the heavy density bed but, rather, appear to float on it. The heaviest particles, however, eventually sink through it.

Considering the coarse sizing chambers 15 as separately controlled units, the operation in each proceeds as follows. During start-up of the settling vessel, when only driving water is being introduced to chamber 15 via opening 30, and no feed pulp is being delivered via delivery chute 19, there is being exerted at the level of lower orifice 40 a greater pressure than is being exerted at the level of upper orifice 48. The differential in pressure is due to the difference in the water column heights at those two points, i.e. the different hydrostatic heads. For purposes of illustration we will assume that a pressure of 14 lbs./sq. in. is being exerted at the level of orifice 40, and a pressure of 10 lb./sq. in. is being exerted in the region of orifice 48. The 4 lbs. of differential pressure is accordingly transmitted via lines 43 and 47 to differential pressure cell 44. The amount of differential pressure required to cause cell 44 to send a valve opening signal to discharge valve 37 will have been pre-set to a value substantially greater than the 4 lbs. being transmitted to it and valve 37 will accordingly remain closed.

As feed pulp is introduced to tank 11, a dense slurry of sized coarse particles will begin building up in the lower region of coarse sizing chamber 15. As the amount of this sized coarse material increases in the chamber (due to the continued introduction to the chamber of coarse material from the feed pulp) and the bed height of the material rises above the level of the lower orifice 40, an increased pressure is exerted in the region of the lower orifice 40. This rise in pressure is due to the increasing density of the water-solids mixture in the area above the level of orifice 40.

The pressure in the area of upper orifice 48 will also rise because of the increasing solids content in the water above the level of that orifice as well. The degree of pressure rise will be greater in the region of the lower orifice, however, due to the greater concentration of coarse material in the region of the chamber lying between the levels of the two orifices. Thus, to continue the illustration, the pressure at the lower orifice may rise with the continued introduction of coarse solids to value of, say, 22 lbs./sq. in. while the pressure at the upper orifice rises to, say, only 14 lbs./sq. in. Thus the differential pressure is seen to increase from 4 to 8 lbs. Assuming that differential pressure cell 44 has been pre-set so as to generate valve opening stimuli when it reads a differential pressure of 8 lbs., then the attainment of the above conditions of coarse material accumulation in chamber 15 will cause cell 44 to transmit an electrical signal to electrically-operated discharge valve 37 causing the latter to open and to permit the discharge of a slurry of sized coarse material from the chamber.

As the sized coarse material leaves chamber 15 the density of the material therein will lessen, thereby reducing the differential pressure across the upper and lower orifices. When the differential pressure has dropped to a predetermined minimum value, say 5 lbs., differential pressure cell 44 will automatically close valve 37, for example by the transmission of a second electrical signal thereto, and the discharge of material from chamber 15 will cease. The continued introduction into the vessel of feed pulp containing coarse material results in a re-accumulation of coarse material in chamber 15, thus initiating a new cycle of coarse product build-up and discharge. To given an idea of the time required to complete one cycle, it may take, for example, about 10 minutes to build the required charge of sized coarse material and only about 1 minute to discharge it from the chamber. As indicated above, the closing of valve 37 can, if desired, be effected by a timing mechanism rather than by the attainment of a predetermined minimum amount of accumulated coarse material in chamber 15.

As indicated earlier, the above-described cyclical process of sizing and discharging coarse material takes place in each of the coarse sizing chambers 15 of the settling vessel of the drawings. As embodied in the apparatus of the drawings, the cycle in each of the coarse sizing chambers is independent of the operation in the other chambers. It is within the scope of the invention, however, that, rather than having a separate monitoring system for each of the coarse sizing chambers, there can be provided separate monitoring systems for a plurality of groups of sizing chambers. Thus, with a vessel containing, say, 30 baffle plates and, therefore, 30 coarse sizing chambers, the chambers can be grouped into 10 banks of 3 adjacent chambers each, and a separate control system can be provided for each bank. Each monitoring device, then, can be operatively connected to, for instance, only the middle chamber of each bank, but it would operate in response to conditions in that middle chamber to open or close the discharge valve of all 3 chambers simultaneously.

It is claimed:

1. In an apparatus for hydraulically separating particulate solids according to particle settling rate, the combination of
    a vertically disposed, circuitous tank adapted to contain liquid and having overflow means at its upper end for removal of non-settling solids, said tank having a circuitous outer wall and a circuitous inner wall which rises concentrically with the outer wall to a level intermediate the top and the bottom of said outer wall and which inclines inwardly above said level to define a lower chamber in the tank having a uniform cross-sectional area throughout its height up to the point of inclination of the inner wall and to define an upper chamber in the tank extending from the point of inclination and being of increasingly larger cross-sectional area from the point of inclination upwards;
    slurry supply means for feeding to the tank as a downwardly flowing slurry along the inclined sides of the upper portion of the inner wall a liquid slurry of the solids to be separated;
    liquid supply and distribution means for introducing dispersed driving liquid to the lower chamber via an inlet in the bottom of said chamber to effectuate hindered settling of solids within the tank, accumulation of coarse solids within said lower chamber, and maintenance of a continuous rise of liquid in said tank to the overflow means;
    and coarse product discharge means positioned above said liquid supply and distribution means for discharging accumulated coarse solids from said lower chamber.

2. The apparatus of claim 1 wherein the circuitous outer wall of the tank is cylindrically shaped and the upper portion of the circuitous inner wall inclines inwardly to define an upper frusto-conical portion.

3. The apparatus of claim 2 wherein a plurality of vertically disposed baffle plates are radially positioned within the tank and terminate at their upper ends at a level no higher than the level of the jucture of the upper and lower portions of said inner wall and terminate at their lower ends at the bottom of said tank, said plates thereby dividing the lower chamber of said tank into a plurality of vertically disposed coarse sizing chambers.

4. In an apparatus for hydraulically separating particulate solids according to particle settling rate, the combination of
    an annular, vertically disposed tank adapted to contain liquid and having overflow means at its upper end for removal of non-settling solids, said tank having a cylindrical outer wall and an inner wall which rises concentrically with the outer wall to a level intermediate the top and the bottom of said outer wall to define a lower cylindrical portion and which inclines inwardly above said level to define an upper frusto-conical portion;
    a plurality of vertically disposed baffle plates radially positioned within the tank and terminating at their upper ends at a level no higher than the level of the juncture of the upper and lower portions of said inner wall and terminating at their lower ends at the bottom of said tank, said plates thereby dividing the lower annular portion of said tank into a plurality of vertically disposed coarse sizing chambers;
    slurry supply means for feeding to the tank as a downwardly flowing slurry along the inclined sides of the frustoconically shaped upper portion of the inner wall a liquid slurry of the solids to be separated;
    for each of the coarse sizing chambers, liquid supply and distribution means for introducing dispersed driving liquid thereinto via an inlet in the bottom of said chamber to effectuate hindered settling of solids within the tank, accumulation of coarse solids within said lower chamber, and maintenance of a continuous rise of liquid in said tank to the overflow means;
    for each of the coarse chambers, coarse product discharge means positioned above said liquid supply and distribution means for discharging accumulated coarse solids from said chamber;

and means for monitoring the amount of accumulated coarse solids in said coarse rising chambers, said monitoring means being operable for activating the coarse product discharge means for the chambers in response to the amount of accumulated coarse solids in the chambers increasing to a predetermined maximum and for inactivating said discharge means either in response to the passing of a predetermined length of time after activation thereof or in response to the amount of accumulated coarse solids decreasing to a predetermined minimum.

5. In an apparatus for hydraulically separating particulate solids according to particle settling rate, the combination of an annular, vertically disposed tank adapted to contain liquid and having overflow means at its upper end for removal of non-settling solids, said tank having a cylindrical outer wall and an inner wall which rises concentrically with the outer wall to a level intermediate the top and the bottom of said outer wall to define a lower cylindrical portion and which inclines inwardly above said level to define an upper frustoconical portion;

a plurality of vertically disposed baffle plates radially positioned within the tank and terminating at their upper ends at a level no higher than the level of the juncture of the upper and lower portions of said inner wall and terminating at their lower ends at the bottom of said tank, said plates thereby dividing the lower annular portion of said tank into a plurality of vertically disposed coarse sizing chambers;

slurry supply means for feeding to the tank as a downwardly flowing slurry along the inclined sides of the frustoconically shaped upper portion of the inner wall a liquid slurry of solids to be separated;

for each of the coarse sizing chambers, liquid supply and distribution means for introducing dispersed driving liquid thereinto via an inlet in the bottom of said chamber to effectuate hindered settling of solids within the tank, accumulation of coarse solids within said lower chamber, and maintenance of a continuous rise of liquid in said tank to the overflow means;

for each of the coarse sizing chambers, coarse product discharge means positioned above said liquid supply and distribution means for discharging accumulated coarse solids from said chamber;

and for each of at least two of the coarse sizing chambers, means for monitoring the amount of accumulated coarse solids in said chamber, said monitoring means being operable for activating the coarse product discharge means for the chamber being monitored in response to the amount of accumulated coarse solids in that chamber increasing to a predetermined maximum and for inactivating said discharge means either in response to the passing of a predetermined length of time after activation thereof or in response to the amount of accumulated coarse solids decreasing to a predetermined minimum, the combination of all of said monitoring means for the apparatus being operable to so activate and inactivate all of the coarse product discharge means of said apparatus.

6. The apparatus of claim 5 wherein the upper end of the frusto-conically shaped upper portion of the inner wall of the annular tank terminates at a level below the top of the outside wall of said annular tank, and there is positioned above and coaxially with said frustoconically shaped upper portion of said inner wall an open-top overflow vessel, said vessel having a smaller diameter than the diameter of the cylindrically shaped lower portion of the inner wall of said annular tank, the upper edge of said vessel terminating at a level below the top of the outer wall of said annular tank, thereby forming a weir for the overflow of liquid and non-settling solids from said annular tank; and said vessel having means for removing from the system the liquid and non-settling solids which overflow thereinto.

7. The apparatus of claim 5 wherein the number of the vertically disposed baffle plates is from 4 to about 60.

8. The apparatus of claim 7 wherein each of the coarse sizing chambers is provided with said monitoring means.

9. The apparatus of claim 8 having a frusto-conically shaped shroud positioned above and coaxially with the frusto-conically shaped upper portion of the inner wall, said shroud being spaced apart from said inner wall to define a downwardly opening, annular slurry inlet space therebetween, the bottom edge of said shroud terminating above the level of the juncture of the upper and lower portions of said inner wall.

10. The apparatus of claim 1 wherein the baffle plates terminate at their upper ends at approximately the level of the juncture of the upper and lower portions of said inner wall.

11. The apparatus of claim 5 wherein each of said monitoring means is operable for monitoring the amount of accumulated coarse solids in the coarse sizing chamber by being operable for measuring the differential pressure exerted by the contents of said chamber over a region in said chamber which is intermediate the bottom of said chamber and the upper ends of the baffle plates.

12. The apparatus of claim 5 wherein each of said coarse product discharge means is operable for discharging accumulated coarse solids from the coarse sizing chamber via a coarse product outlet near the bottom of said chamber.

13. The apparatus of claim 5 wherein each of said monitoring means is operable for inactivating said coarse product discharge means in response to the passing of said predetermined length of time after activation thereof.

14. The apparatus of claim 5 wherein each of said monitoring means is operable for inactivating said coarse product discharge means in response to the amount of accumulated coarse solids in the chamber being monitored decreasing to a predetermined minimum.

15. In an apparatus for hydraulically separating particulate solids according to particle settling rate, the combination of an annular, vertically disposed tank adapted to contain liquid and having overflow means at its upper end for removal of non-settling solids, said tank having a cylindrical outer wall and an inner wall which rises concentrically with the outer wall to a level intermediate the top and bottom of said outer wall to define a lower cylindrical portion and which inclines inwardly above said level to define an upper frustoconical portion;

from 4 to about 60 vertically disposed baffle plates radially positioned within the tank and terminating at their upper ends at approximately the level of the juncture of the upper and lower portions of said inner wall and terminating at their lower ends at the bottom of said tank, said plates thereby dividing the lower annular portion of said tank into a plurality of vertically disposed coarse sizing chambers;

a frustoconically shaped shroud positioned above and coaxially with the frustoconically shaped upper portion of the inner wall, said shroud being spaced apart from said inner wall to define a downwardly opening, annular slurry inlet space therebetween, the bottom edge of said shroud terminating above the level of the juncture of the upper and lower portions of said inner wall;

slurry supply means for feeding to the tank as a downwardly flowing slurry through the annular slurry inlet space a liquid slurry of the solids to be separated;

for each of the coarse sizing chambers, liquid supply and distribution means for introducing dispersed driving liquid thereinto via an inlet in the bottom of said chamber to effectuate hindered settling of solids within the tank, accumulation of coarse solids within said lower chamber, and maintenance of continuous rise of liquid in said tank to the overflow means;

for each of the coarse sizing chambers, coarse product discharge means positioned above said liquid supply and distribution means for discharging accumulated coarse solids from said chamber via a coarse product outlet near the bottom of said chamber;

and for each of the coarse sizing chambers, means for monitoring the amount of accumulated coarse solids in said chamber, said monitoring means being operable for activating the coarse product discharge means for the chamber being monitored in response to the amount of accumulated coarse solids in that chamber increasing to a predetermined maximum and for inactivating said discharge means either in response to the passing of a predetermined length of time after activation thereof or in response to the amount of accumulated coarse solids decreasing to a predetermined minimum.

16. The apparatus of claim 15 wherein the upper end of the frusto-conically shaped upper portion of the inner wall of the annular tank terminates at a level below the top of the outer wall of said annular tank, and there is positioned above and coaxially with said frusto-conically shaped upper portion of said inner wall an open-top over-flow vessel, said vessel having a smaller diameter than the diameter of the cylindrically shaped lower portion of the inner wall of said annular tank, the upper edge of said vessel terminating at a level below the top of the outer wall of said annular tank, thereby forming a weir for the overflow of liquid and non-settling solids from said annular tank; and said vessel having means for removing from the system the liquid and non-settling solids which overflow thereinto.

17. The apparatus of claim 16 wherein each of said monitoring means is operable for monitoring the amount of accumulated coarse solids in the coarse sizing chamber by being operable for measuring the differential pressure exerted by the contents of said chamber over a region in said chamber which is intermediate the bottom of said chamber and the upper ends of the baffle plates.

18. The apparatus of claim 17 wherein each of said monitoring means is operable for inactivating said coarse product discharge means in response to the passing of said predetermined length of time after activation thereof.

19. The apparatus of claim 17 wherein each of said monitoring means is operable for inactivating said coarse product discharge means in response to the amount of accumulated coarse solids in the chamber being monitored decreasing to a predetermined minimum.

20. The apparatus of claim 17 wherein each of said coarse sizing chambers has a horizontal cross-sectional area of about 1.75 to 3.25 square feet.

21. A process for hydraulically separating particulate solids according to particle settling rate comprising
maintaining a continuous vertical rise of dispersed driving liquid in a vertically disposed, annular sizing zone composed of a lower region and an upper region, said lower region being defined by substantially vertical inner and outer walls which provide a uniform horizontal cross-sectional area throughout the height of the lower region, and said upper region being defined by a substantially vertical extension of said outer wall and by an inclining extension of said inner wall, said inclination being away from said outer wall extension so as to provide an upper region which has an increasingly larger horizontal cross-sectional area than that of the lower region;
introducing into the upper region of the zone a downwardly flowing slurry of the solids to be separated along the inclined inner wall ertension so as to effectuate hindered settling of the solids within the sizing zone and accumulation of coarse solids in the lower region of the zone;
continuously withdrawing driving liquid and any non-settling solids suspended therein from near the top of the upper region of the zone;
allowing coarse solids to accumulate in the lower region of the zone until a predetermined maximum amount of said solids are accumulated therein; and, upon said maximum amount of coarse solids being accumulated, withdrawing from said lower region at a point near the bottom thereof an amount of said accumulated solids to provide a predetermined minimum amount of remaining coarse solids within said lowermost region.

22. The process of claim 21 wherein the lower region of the sizing zone is divided into a plurality of coarse sizing chambers, said vertical rise of driving liquid being maintained in each of said chambers, said coarse solids being allowed to accumulate in each of said chambers to said predetermined maximum amount, and said withdrawing of coarse solids being effected from each of said chambers to provide said predetermined minimum amount of remaining coarse solids.

23. The process of claim 22 including separately monitoring the amount of accumulated coarse solids in at least 2 of said coarse sizing chambers and withdrawing said accumulated coarse solids from each monitored chamber without regard to the amount of coarse solids accumulated in the remaining monitored chambers.

24. The process of claim 23 wherein each of said coarse sizing chambers is monitored.

25. The process of claim 24 wherein the lower region of the sizing zone is divided into from 4 to about 60 coarse sizing chambers.

26. The process of claim 25 wherein the predetermined maximum amount of accumulated coarse solids in each coarse sizing chamber is that amount represented by a bed height of said accumulated solids within the chamber of no more than 90 percent of the height of said chamber and the predetermined minimum amount of accumulated coarse solids in each chamber is that amount represented by a bed height of said accumulated solids within the chamber of no less than about 15 percent of the height of said chamber.

27. The process of claim 26 wherein the horizontal cross-sectional area of each coarse sizing chamber is about 1.75 to 3.25 square feet.

28. The process of claim 27 wherein the driving liquid is water.

References Cited

UNITED STATES PATENTS

| 2,025,412 | 12/1935 | Handy | 209—161 |
|---|---|---|---|
| 2,418,821 | 4/1947 | Coghill | 209—158 |
| 2,784,841 | 3/1957 | Evans | 209—158 |
| 3,295,677 | 1/1967 | Condolios | 209—136 |
| 3,351,195 | 11/1967 | Hukki | 209—157 X |

FOREIGN PATENTS 25,936     1912    Great Britain.

FRANK W. LUTTER, Primary Examiner

U.S. Cl. X.R.

209—496, 498